(12) United States Patent
Atighetchi et al.

(10) Patent No.: US 11,233,707 B2
(45) Date of Patent: Jan. 25, 2022

(54) METADATA-BASED INFORMATION PROVENANCE

(71) Applicant: Raytheon BBN Technologies Corp., Cambridge, MA (US)

(72) Inventors: Michael Hassan Atighetchi, Framingham, MA (US); Stephane Yannick Blais, Framingham, MA (US); Samuel Cunningham Nelson, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 106 days.

(21) Appl. No.: 16/832,039

(22) Filed: Mar. 27, 2020

(65) Prior Publication Data

US 2021/0306227 A1 Sep. 30, 2021

(51) Int. Cl.
*H04L 12/24* (2006.01)
*H04L 29/06* (2006.01)
*G06F 16/907* (2019.01)
*H04L 29/08* (2006.01)

(52) U.S. Cl.
CPC ............ *H04L 41/28* (2013.01); *G06F 16/907* (2019.01); *H04L 63/107* (2013.01); *H04L 63/205* (2013.01); *H04L 67/327* (2013.01)

(58) Field of Classification Search
CPC ....... H04L 41/28; H04L 67/34; H04L 9/3239; H04L 9/006; H04L 29/08711; H04L 67/2804; G06F 16/907; G06F 11/1435; G06F 11/3086; G06F 16/14; G06F 16/24573; G06F 16/38; G06F 16/383; G06F 16/48; G06F 16/483; G06F 16/58; G06F 16/583; G06F 16/68; G06F 16/683

USPC ........................................................... 726/3
See application file for complete search history.

(56) References Cited

U.S. PATENT DOCUMENTS

| 8,898,452 | B2 * | 11/2014 | Plotkin ............... G06F 21/6236 |
| | | | 713/153 |
| 9,130,868 | B2 * | 9/2015 | Kim ........................ H04L 45/64 |
| 9,560,011 | B2 * | 1/2017 | Pal ...................... H04L 63/0281 |
| 9,917,847 | B2 * | 3/2018 | Kacin ................. H04L 63/0428 |
| 9,954,832 | B2 * | 4/2018 | Pollet ...................... H04L 63/08 |
| 10,367,811 | B2 * | 7/2019 | Clark ...................... H04L 67/12 |
| 2004/0243580 | A1 * | 12/2004 | Markki ................. H04L 67/104 |

(Continued)

FOREIGN PATENT DOCUMENTS

| DE | 102014008059 | A1 * | 12/2015 | ......... H04L 63/0414 |
| EP | 3695339 | A1 * | 8/2020 | ........... H04L 9/3239 |

(Continued)

OTHER PUBLICATIONS

ANDS, "Data provenance", 2018 (Year: 2018).*

(Continued)

*Primary Examiner* — Ondrej C Vostal
(74) *Attorney, Agent, or Firm* — Lando & Anastasi, LLP

(57) ABSTRACT

Techniques for metadata-based information provenance are disclosed. A node in a data provisioning layer receives encrypted payload data to be delivered to a recipient. The node generates provenance metadata that describes at least one action taken by the node with respect to the encrypted payload data. The node transmits the encrypted payload data and the provenance metadata via the data provisioning layer toward the recipient.

20 Claims, 8 Drawing Sheets

(56) References Cited

U.S. PATENT DOCUMENTS

| | | | | |
|---|---|---|---|---|
| 2006/0168270 | A1* | 7/2006 | Townsley | H04L 69/324 709/230 |
| 2007/0208937 | A1* | 9/2007 | Cam-Winget | H04W 12/08 713/168 |
| 2009/0144499 | A1* | 6/2009 | Nicholson | G06F 3/0608 711/118 |
| 2010/0287204 | A1* | 11/2010 | Amini | G06F 11/3072 707/802 |
| 2011/0145993 | A1* | 6/2011 | Rader | A61G 9/02 5/604 |
| 2013/0297752 | A1* | 11/2013 | Bhanujan | H04L 41/0803 709/220 |
| 2014/0215080 | A1* | 7/2014 | Alabiso | H04L 41/5054 709/226 |
| 2014/0307538 | A1* | 10/2014 | Iovanna | H04L 45/28 370/218 |
| 2017/0155737 | A1* | 6/2017 | Jannink | H04L 67/327 |
| 2017/0295090 | A1* | 10/2017 | Gopalan | H04L 45/22 |
| 2018/0039524 | A1* | 2/2018 | Dettori | G06F 9/505 |
| 2018/0076930 | A1* | 3/2018 | Buchali | H04L 1/0072 |
| 2018/0309779 | A1* | 10/2018 | Benyo | G06F 21/577 |
| 2018/0309794 | A1* | 10/2018 | Eskridge | H04L 41/08 |
| 2019/0036778 | A1* | 1/2019 | Bathen | H04L 41/0893 |
| 2019/0104086 | A1* | 4/2019 | Pope | H04L 69/324 |
| 2019/0109713 | A1* | 4/2019 | Clark | H04L 9/3239 |
| 2019/0173854 | A1* | 6/2019 | Beck | H04L 9/3239 |
| 2020/0183766 | A1* | 6/2020 | Kumar-Mayernik | G06F 40/169 |
| 2020/0186507 | A1* | 6/2020 | Dhanabalan | H04L 63/0272 |
| 2020/0210427 | A1* | 7/2020 | Dugan | G06F 16/24542 |
| 2020/0250008 | A1* | 8/2020 | Cleave | H04L 67/34 |
| 2020/0302449 | A1* | 9/2020 | Wagner | H04N 1/00801 |
| 2020/0310394 | A1* | 10/2020 | Wouhaybi | H04L 67/125 |

FOREIGN PATENT DOCUMENTS

| | | | | |
|---|---|---|---|---|
| JP | | 5639660 B2 * | 12/2014 | H04L 63/102 |
| WO | WO-2007142952 A2 * | | 12/2007 | H04L 41/0806 |
| WO | WO-2020036239 A1 * | | 2/2020 | H04L 9/14 |

OTHER PUBLICATIONS

Atighetchi et al., "Adaptive Use of Network-Centric Mechanisms in Cyber-Defense", 2003 (Year: 2003).*
Atighetchi et al., "Transparent Insertion of Custom Logic in HTTP(s) Streams Using PbProxy", 2011 (Year: 2011).*
Cardellini et al., "A Decentralized Approach to Network-Aware Service Composition", 2015 (Year: 2015).*
D'Andria et al., "Data Movement in the Internet of Things Domain", 2015 (Year: 2015).*
Datacite.org, "Tracking metadata provenance", 2019 (Year: 2019).*
Grooten et al., "Next Generation Data Management Architecture in Statistical Organisation", 2017 (Year: 2017).*
Melampy et al., "Network Device and method for processing a session using a packet signature", 2018 (Year: 2018).*
Olteanu et al., "Enabling mobile devices for home automation using ZigBee", 2013 (Year: 2013).*
W3C, "What Is Provenance", 2021 (Year: 2021).*
W3C, "Provenance, Metadata, and Trust", 2021 (Year: 2021).*
Zelin et al'., "Privacy preserving verification and submission architecture", CN 201980084017, 2019 (Year: 2019).*
"Attribute Based Encryption for Attribute Based Access Control," ETSI, Technical Specification TS 103 532, 2018.
"Battlefield Airborne Communications Node (BACN)," Capabilities p. 2019.
"Boeing Completes Design Review for U.S. Air Force's Talon HATE Program," Boeing News Release, 2014.
"Content-Based Mobile Edge Networking (CBMEN)," DARPA Program Information, 2020.
"Open Mission Systems (OMS)," U.S. Air Force Virtual Distributed Laboratory, 2020.
Barreto, P.S.L.M., et al. "Efficient and Provably-Secure Identity-Based Signatures and Signcryption from Bilinear Maps," Proceedings of the 11th International Conference on Theory and Application of Cryptology and Information Security, 2005, pp. 515-532.
Butler, A. "5th-to-4th Gen Fighter Comms Competition Eyed in Fiscal 2015," Aviation Week & Space Technology, 2014.
Butler, M. "The Developer's Guide to Cursor on Target," MITRE, 2005.
Evans, J. B. "Dynamic Network Adaptation for Mission Optimization (DyNAMO)," DARPA Program Information, 2019.
Hess, F. "Efficient Identity Based Signature Schemes Based on Pairings," Revised Papers from the 9th Annual International Workshop on Selected Areas in Cryptography, 2003, pp. 310-324.
Jacobson, V., et al. "Networking Named Content," Proceedings of the 5th International Conference on Emerging Networking Experiments and Technologies, 2009, pp. 1-12.
Joint Task Force Transformation Initiative. "Security and Privacy Controls for Federal Information Systems and Organizations," NIST Special Publication, vol. 800, No. 53, 2013, pp. 8-13.
Jones, J. "System of Systems Integration Technology and Experimentation (SoSITE)," DARPA Program Information, 2019.
Khoury, J., et al. "An Efficient and Expressive Access Control Architecture for Content-Based Networks," 2014 IEEE Military Communications Conference, 2014, pp. 1034-1039.
Kiser, A., et al. "The Combat Cloud," Research Report Submitted to the Faculty of Air Command and Staff College (ACSC), 2017.
Lebo, T., et al. "PROV-O: The PROV Ontology," W3C, W3C Recommendation, vol. 30, 2013.
Malenic, M. "Jetpack Enables Comms Between F-22/35 and Legacy Aircraft," F-16.net, 2014.
Prud'hommeaux, E. and Seaborne A. "SPARQL Query Language for RDF," W3C, W3C Recommendation, 2008.
Strayer, T., et al. "CASCADE: Content Access System for the Combat-Agile Distributed Environment," IEEE MILCOM, 2013, pp. 1518-1523.
Strayer, T., et al. "Mission-Centric Content Sharing Across Heterogeneous Networks," 2019 International Conference on Computing, Networking and Communications (ICNC), 2019, pp. 1034-1038.
Wood, D. et al. "RDF 1.1 Concepts and Abstract Syntax," W3C, W3C Recommendation, 2014.
Xylomenos, G., et al. "A Survey of Information-Centric Networking Research," in IEEE Communications Surveys & Tutorials, vol. 16, No. 2, 2014, pp. 1024-1049.
Zhang, L., et al. "Named Data Networking," ACM SIGCOMM Computer Communication Review, vol. 44, No. 3, 2014, pp. 66-73.
Zhang, Z., et al. "Security Support in Named Data Networking," Technical Report, 2018.

* cited by examiner

METADATA-BASED INFORMATION PROVENANCE

STATEMENT REGARDING FEDERALLY-SPONSORED RESEARCH OR DEVELOPMENT

This application was made with government support under Contract No. FA8750-19-C-0535 awarded by the Air Force Research Laboratory (AFRL). The U.S. Government has certain rights in this invention.

BACKGROUND

When transmitting data over a network, the timeliness and accuracy of the transmission are typically important considerations. Various techniques also exist to help ensure that data is transmitted securely and to the intended recipient. However, a recipient (a.k.a. "consumer") of the data is not always able to confirm that the data received is trustworthy, or determine the path that the data followed in transit from the producer to the consumer. If data is not trustworthy, the recipient may not be able to rely on the data to make important decisions (e.g., targeting decisions in combat situations at the tactical edge, business decisions, medical decisions, and/or other kinds of decisions that depend on the trustworthiness of private, sensitive, or otherwise mission-critical data).

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to information provenance in networked computer systems.

SUMMARY

One or more embodiments provide robust provenance trails for payload data, by generating provenance metadata in a data provisioning layer that manages dissemination of the payload data. Provenance trails may describe, for example, data origins and operations performed by intermediate nodes. In addition, one or more embodiments assess the trustworthiness of payload data, based on provenance metadata. Thus, one or more embodiments help ensure that authoritative data sources are used and that the payload data supplied by those sources is trustworthy.

Provenance information and trustworthiness computations, based on provenance metadata as described herein, may be useful in many different contexts. For example, in combat situations, provenance information and trustworthiness computations may allow for mission-critical decisions based on trusted information. Provenance information and trustworthiness computations may also be useful in non-combat situations, such as business or medical settings dealing with the transmission of trade secrets, personally identifiable information, and/or other kinds of private and/or sensitive data. Provenance information may provide insights such as who originally produced the payload data, how the payload data was shaped or otherwise transformed in transit, and/or what path the payload data followed in transit.

In general, in one aspect, one or more non-transitory machine-readable media store instructions that, when executed by one or more processors, cause: a first node in a data provisioning layer receiving encrypted payload data to be delivered to a recipient; the first node generating first provenance metadata that describes at least one action taken by the first node with respect to the encrypted payload data; and the first node transmitting the encrypted payload data and the first provenance metadata via the data provisioning layer toward the recipient. The at least one action taken by the first node with respect to the encrypted payload data may include one or more of receiving the encrypted payload data and/or transforming decrypted contents of the encrypted payload data. The first node may not be authorized to decrypt the encrypted payload data, and generating the first provenance metadata may be performed without decrypting the encrypted payload data. The recipient may be physically located at a tactical edge of a military mission.

The one or more non-transitory machine-readable media may further store instructions that, when executed by one or more processors, cause: a second node in the data provisioning layer receiving the encrypted payload data and the first provenance metadata; and based at least on the first provenance metadata, the second node computing a trustworthiness metric associated with the encrypted payload data. Computing the trustworthiness metric may include applying at least one user-configurable trustworthiness rule to the first provenance metadata.

The one or more non-transitory machine-readable media may further store instructions that, when executed by one or more processors, cause: the first node encrypting the first provenance metadata, using a first encryption policy that is different from a second encryption policy used to encrypt the encrypted payload data.

The one or more non-transitory machine-readable media may further store instructions that, when executed by one or more processors, cause: receiving user input that defines at least part of a provenance metadata policy; and responsive to receiving the user input, configuring multiple nodes in the data provisioning layer to generate provenance metadata according to the provenance metadata policy.

The one or more non-transitory machine-readable media may further store instructions that, when executed by one or more processors, cause: aggregating the first provenance data with a set of provenance metadata associated with multiple payload transmissions; and based at least on the set of provenance metadata, generating a visual representation of one or more provenance paths through the data provisioning layer.

In general, in one aspect, a system includes: a data provisioning layer; and a first node in the data provisioning layer. The node is configured to perform operations including: receiving encrypted payload data to be delivered to a recipient, generating first provenance metadata that describes at least one action taken by the first node with respect to the encrypted payload data, and transmitting the encrypted payload data and the first provenance metadata via the data provisioning layer toward the recipient. The system may further include a second node in the data provisioning layer, configured to perform operations including: receiving the encrypted payload data and the first provenance metadata, and based at least on the first provenance metadata, computing a trustworthiness metric associated with the encrypted payload data.

In general, in one aspect, a method includes: a first node in a data provisioning layer receiving encrypted payload data to be delivered to a recipient; the first node generating first provenance metadata that describes at least one action taken by the first node with respect to the encrypted payload data; and the first node transmitting the encrypted payload data and the first provenance metadata via the data provisioning layer toward the recipient. The at least one action taken by the first node with respect to the encrypted payload data may include one or more of receiving the encrypted payload data and/or transforming decrypted contents of the encrypted payload data.

1. The method may further include: a second node in the data provisioning layer receiving the encrypted payload data and the first provenance metadata; and based at least on the first provenance metadata, the second node computing a trustworthiness metric associated with the encrypted payload data. Computing the trustworthiness metric may include applying at least one user-configurable trustworthiness rule to the first provenance metadata. The first node may not be authorized to decrypt the encrypted payload data, and generating the first provenance metadata may be performed without decrypting the encrypted payload data. The recipient may be physically located at a tactical edge of a military mission.

The method may further include: the first node encrypting the first provenance metadata, using a first encryption policy that is different from a second encryption policy used to encrypt the encrypted payload data.

The method may further include: receiving user input that defines at least part of a provenance metadata policy; and responsive to receiving the user input, configuring multiple nodes in the data provisioning layer to generate provenance metadata according to the provenance metadata policy.

The method may further include: aggregating the first provenance data with a set of provenance metadata associated with multiple payload transmissions; and based at least on the set of provenance metadata, generating a visual representation of one or more provenance paths through the data provisioning layer.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1A:
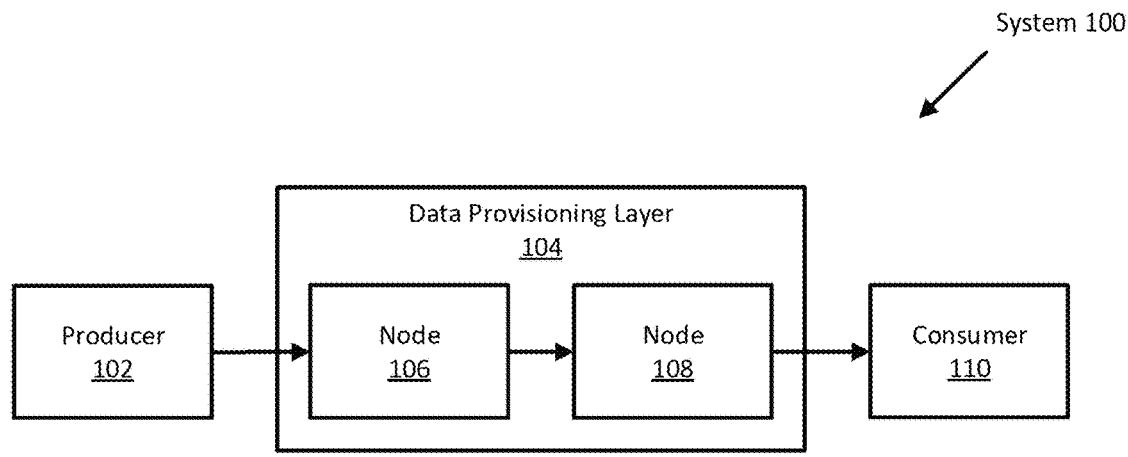
FIGS. 1A-1B are block diagrams of an example of a system according to an embodiment.
Figure 1B:
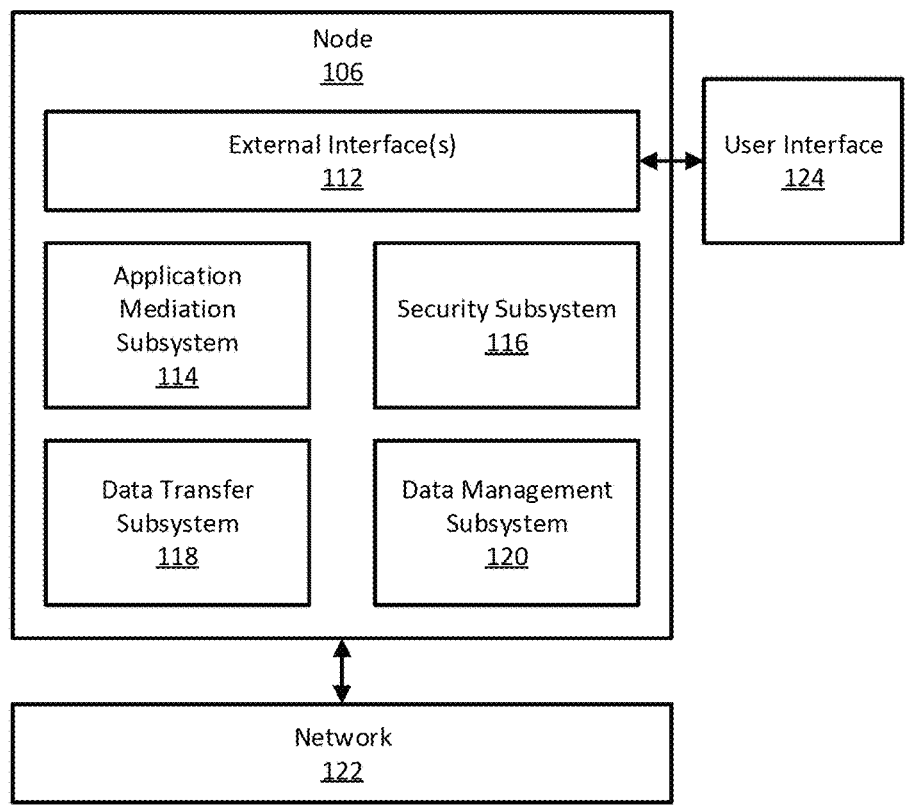

FIGS. 1A-1B are block diagrams of an example of a system 100 according to an embodiment. In an embodiment, the system 100 may include more or fewer components than the components illustrated in FIGS. 1A-1B. The components illustrated in FIGS. 1A-1B may be local to or remote from each other. The components illustrated in FIGS. 1A-1B may be implemented in software and/or hardware. Each component may be distributed over multiple applications and/or machines. Multiple components may be combined into one application and/or machine. Operations described with respect to one component may instead be performed by another component.

In an embodiment, a producer 102 is configured to transmit payload data (e.g., image data, text data, video data, and/or any other kind of payload data or combination thereof) to a consumer 110, across a network 122. A data provisioning layer 104 refers to hardware and/or software that provides an abstraction over the network 122, where the network 122 provides the physical infrastructure and basic networking protocols necessary to transmit data between devices. Specifically, the data provisioning layer 104 is configured to manage the receipt and dissemination of payload data from the producer 102 to the consumer 110, via the network 122. The data provisioning layer 104 may provide a publish/subscribe interface, whereby the consumer 110 subscribes to payload data produced by the producer 102. The producer 102 publishes payload data to the data provisioning layer 104, which disseminates the payload data across the nodes 106, 108. Dissemination within the data provisioning layer 104 may also use a publish/subscribe model between nodes. Nodes with in the data provisioning layer 104 may be heterogenous, meaning that they are different kinds of devices that communicate using different waveforms. Any combination of heterogenous devices may form a data provisioning layer 104, as long as each node supports the necessary protocols to communicate with each other (e.g., to interact with the publish/subscribe interface, to enforce security policies, and/or to generate provenance metadata as needed).

Based on the consumer 110's subscription to payload data from the producer 102, the consumer 110 obtains the payload data from the data provisioning layer 104 (e.g., from node 108O). The data provisioning layer 104 may provide payload data to the consumer 110 using a push model. For example, node 108 may notify the consumer 110 when the subscription has new payload data available. Alternatively, the data provisioning layer 104 may provide payload data to the consumer 110 using a pull/polling model. For example, the consumer 110 may periodically or intermittently query the data provisioning layer 104 to determine whether the subscription has new payload data available. The data provisioning layer 104 may use Robust Information Gateway (RIG) technology developed under the Defense Advanced Research Projects Agency (DARPA) Dynamic Network Adaptation for Mission Optimization (DyNAMO) program. Alternatively, the data provisioning layer 104 may use other technology to receive and disseminate payload data.

In an embodiment, the data provisioning layer 104 is configured to perform operations described herein for metadata-based information provenance. Specifically, as payload data passes from the producer 102 to the consumer 110, one or more nodes 106, 108 in the data provisioning layer 104 may be configured to generate provenance metadata that describes one or more actions taken, by the node(s), with respect to the payload data. Examples of operations for metadata-based information provenance, and examples of applications thereof, are described below. Provenance metadata may be expressed as rich metadata that encodes information such as information types and information attributes. For example, provenance metadata may include Resource Description Framework (RDF) literals. In addition, the provenance metadata may be generated using a provenance metadata ontology. For example, provenance metadata may serialized as PROV Ontology (PROV-O) models or using another ontology. As described in further detail below, the provenance data may not be encoded in the payload data itself.

A node in the data provisioning layer 104 may include various components and/or subsystems. As illustrated in FIG. 1B, a node 106 may include one or more external interfaces 112. An external interface 112 refers to a set of hardware and/or software that one or more components external to the node 106 may use to access data and/or functions within the node 106.

The external interface(s) 112 may include an application programming interface (API) that allows access by applications executing outside of the node 106 (e.g., an application executing at the producer 102) to data and/or functions of the node 106. The API may operate behind an additional abstraction layer, such as the Open Mission Systems Abstract Service Bus (OMS ASB). Alternatively or additionally, the API may support interactions with a cross-domain solution (CDS). The API may allow an application to continue using the data provisioning layer 104, without any changes to the application's code, even when functionality within the data provisioning layer 104 is changed. For example, metadata-based information provenance features may be programmatically added to a data provisioning layer 104, without requiring any changes to the code of an external application that uses the data provisioning layer to publish/subscribe to payload data.

In an embodiment, an application mediation subsystem 114 is configured to mediate communication between external applications (e.g., requests received via an API as described above) and internal components of the node 106. For example, the application mediation subsystem 114 may include one or more adapters such as OMS Critical Abstraction Layer (CAL) and/or another kind of adapter. The application mediation subsystem 114 may include a cross-domain solution (CDS) agent configured to communicate with a CDS. The application mediation subsystem 114 may include one or more parsers (e.g., an extensible markup language (XML) parser and/or another kind of parser) configured to parse data received from external sources. The application mediation subsystem 114 may include one or more mappers configured to map API requests to internal functions of the node 106. For example, the application mediation subsystem 114 may include an OMS Universal Command and Control Interface (UCI) mapper configured to map UCI requests to internal functions of the node 106.

The external interface(s) 112 may include a monitoring interface. The monitoring interface provides external access to monitoring functions of the node 106, such as status information and/or functions associated with operation and configuration of the data provisioning layer 104 and/or the node 106. For example, the monitoring interface may provide access to one or more functions for configuring metadata-based information provenance (e.g., enabling, disabling, and/or changing parameters of one or more provenance functions, such as whether to generate provenance metadata when disseminating payload data within the data provisioning layer 104). The monitoring interface may provide access to functions that allow an external component to monitor operation of the data provisioning layer 104 and/or the node 106. For example, the monitoring interface may provide access to one or more functions that allow for visualization of provenance flows through the data provisioning layer 104.

The external interface(s) 112 may include a mission interface. The mission interface provides external access to load a mission template into the node 106. The mission template specifies requirements (e.g., Information Exchange Requirements (IER's) and/or another kind of requirement or combination thereof) associated with a military or other kind of objective serviced by the data provisioning layer. For example, the mission template may indicate one or more publish-subscribe relationships and/or one or more service levels for information exchanges (e.g., a minimum service level, an acceptable service level, and/or a maximum service level). The mission interface may further allow a mission template that has already been loaded to be modified or replaced.

The external interface(s) 112 may include a security interface. The security interface provides external access to one or more functions of a security subsystem 116. The security subsystem 116 is configured to protect the security of data handled by the node 106. For example, the security system 116 may provide identity management, public and/or private key management, security policy management, cryptography, and/or other security features.

In an embodiment, the security subsystem 116 is configured to use attribute-based encryption (ABE) to secure payload data and/or provenance metadata. Alternatively or additionally, the security subsystem 116 may use one or more other kinds of security policy. In general, ABE does not require end-to-end sessions or bi-directional exchange of information, making it well suited for securing data in situations where (a) sessions may be difficult to establish and secure, and (b) bi-directional data exchanges may introduce security risks. ABE includes role and content-based cryptographic and granular access control. In role-based access control, attributes describe roles. In content-based access control, attributes describe the content. ABE thus allows for granular policies and high flexibility during deployment. In addition, ABE includes collusion resistance and resilience, because principals cannot collude without combining their keys. Compromise of any number of attribute keys does not further compromise the system. Moreover, ABE includes autonomous authority operations. Each authority has full control over its identity, attribute, and key management services, with no requirement for centralized trust. Autonomous authority operations may be important, for example, in multi-authority (e.g., coalition) environments with varying levels of trust among participants. The security subsystem 116 may use different security policies to secure payload data and provenance metadata, or may use different security policies for each. Because generating provenance metadata, as described herein, does not require a node to decrypt the payload data, a security policy such as ABE allows the data provisioning layer 104 to protect the payload data while allowing for the generation of a provenance trail even for data that is encrypted.

One or more of the external interfaces 112 may be provided by a hypertext transfer protocol (HTTP) web server (not shown) operating in the node 106. The web server may be configured to receive requests (e.g., HTTP GET and/or HTTP POST requests) and supply data responsive to the requests. For example, the web server may be configured to serve web pages that include provenance flow visualizations. Alternatively or additionally, one or more of the external interfaces 112 may use a representational state transfer (REST) protocol and/or may supply data in JavaScript Object Notation (JSON) format. One or more external interface(s) 112 may use different communication protocols.

The node 106 may be configured to present data and/or functions, via one or more external interfaces 112, in one or more user interfaces 124. A user interface 124 renders user interface elements and receives input via user interface elements. A user interface 124 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of a user interface 124 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 124 may be specified in one or more other languages, such as Java, Python, Perl, C, C++, and/or any other language or combination thereof.

As noted above, the data provisioning layer 104 may be an abstraction over a network 122. The external interface(s) 112 may include a network interface configured to communicate with the network 122. A data transfer subsystem 118 may be configured to use the network interface to access the network 122, in order to send and receive data, provision data flows, communicate with other nodes in a global namespace, and/or perform other network-related functions. For example, the data transfer subsystem 118 may be configured to match published data with subscriptions by other nodes and/or consumers. Alternatively or additionally, the data transfer subsystem 118 may be configured to use the network interface to obtain quality of service (QoS) and/or reachability information about paths and destinations within the data provisioning layer 104, to help facilitate the dissemination of payload data from producers to consumers. In an embodiment, the abstraction provided by the network interface allows for cross-waveform communication and/or QoS routing in the data provisioning layer 104, even across heterogeneous devices.

In an embodiment, the node 106 includes a data management subsystem 120. The data management subsystem 120 is configured to manage the contents (e.g., payload data) of messages flowing through the node 106. For example, the data management subsystem 120 may be configured to perform one or more data shaping operations. A data shaping operation modifies (i.e., "shapes") data into a format that is different than the format in which the data was received. Data shaping may compress, segment, or otherwise modify data to account for network congestion. For example, data shaping may downsample or otherwise transform an image to consume less data, allowing for faster transmission and/or reducing network congestion. Alternatively or additionally, the data management subsystem 120 may be configured to prioritize messages to account for message urgency (e.g., depending on mission priority), quality of service (QoS) policies, etc.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2A:
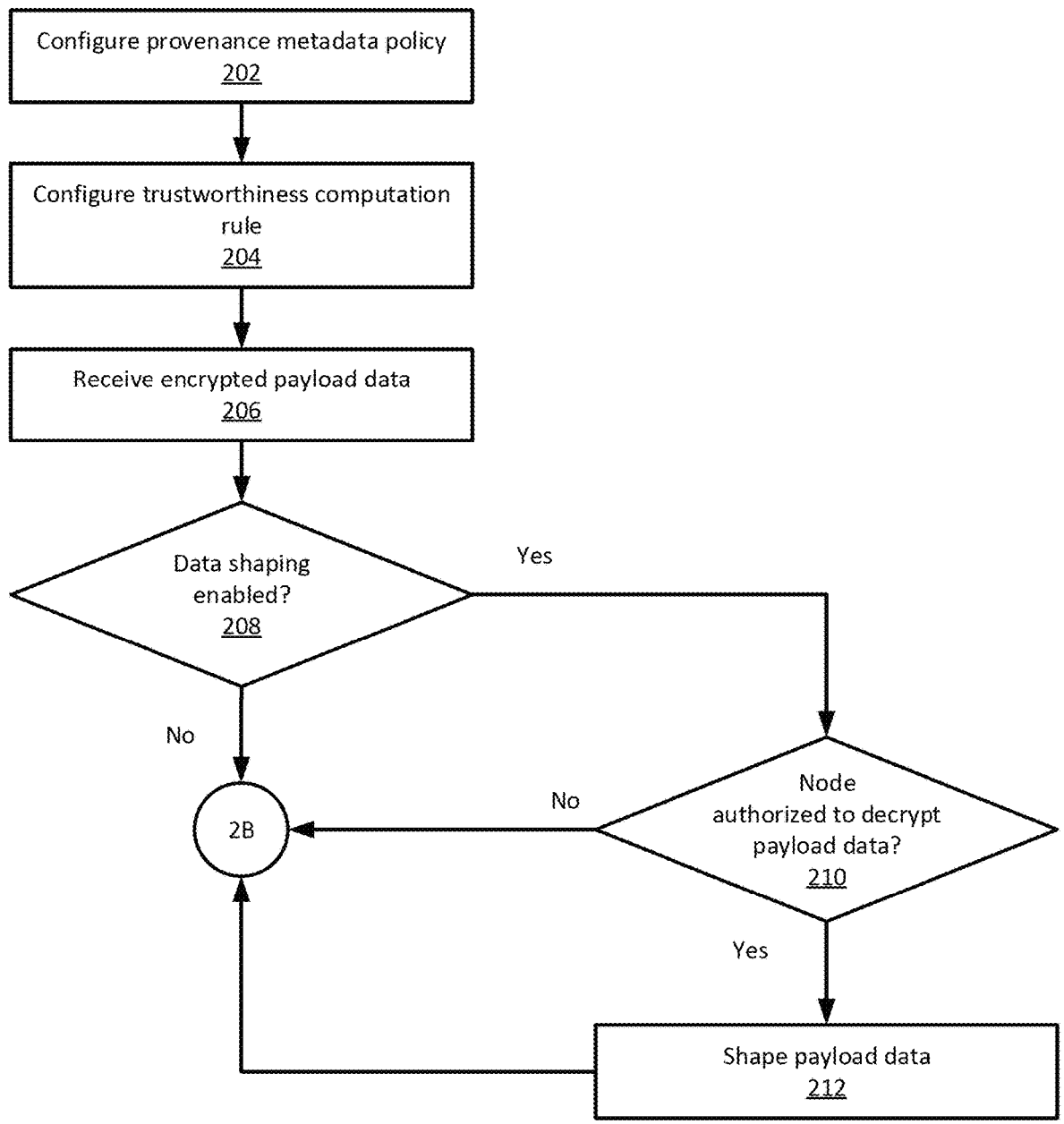
FIGS. 2A-2B are a flow diagram of an example of operations for metadata-based information provenance according to an embodiment.
Figure 2B:
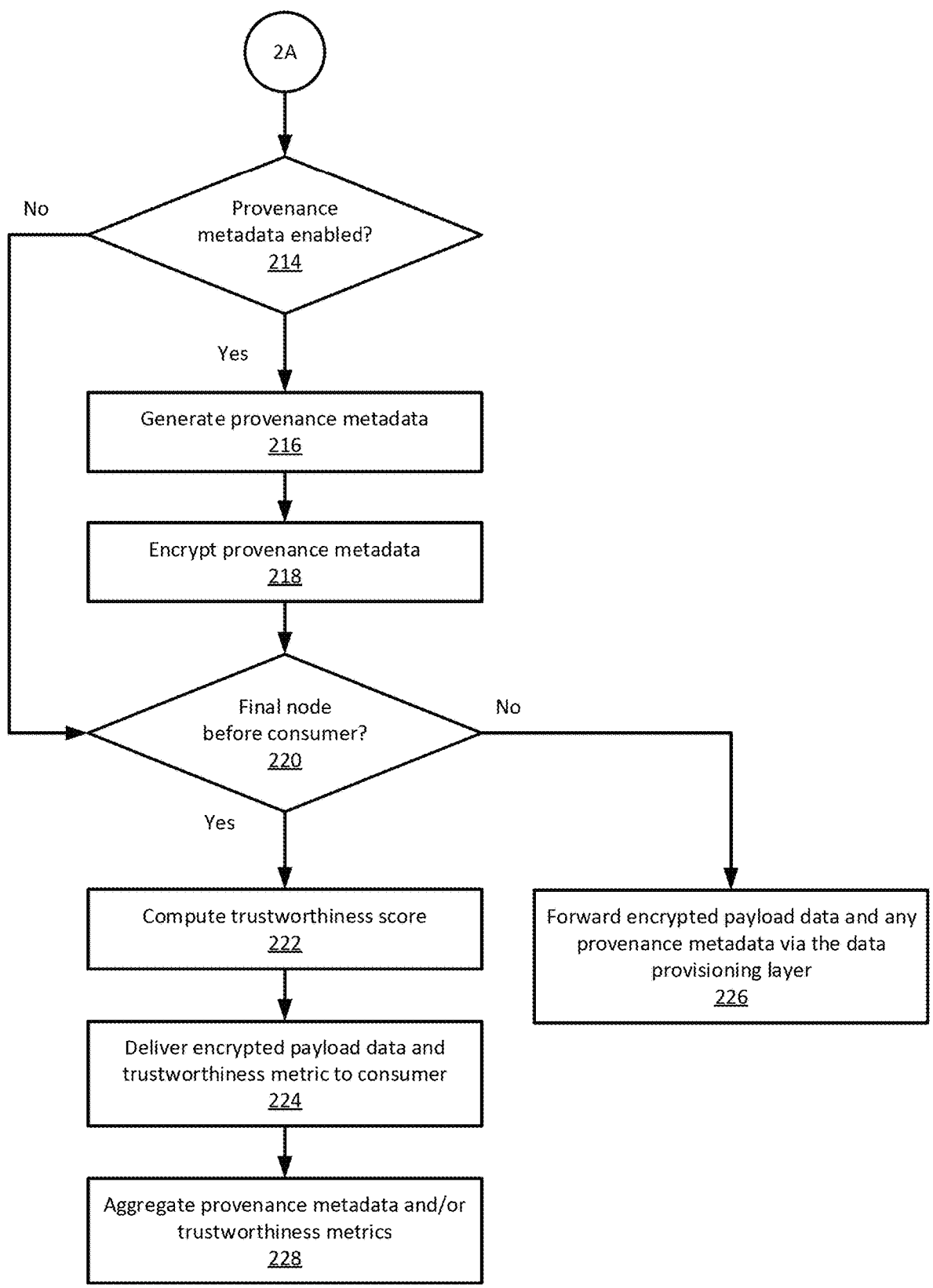

FIGS. 2A-2B are a flow diagram of an example of operations for metadata-based information provenance according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, a system (e.g., one or more components of the system 100 of FIGS. 1A-1B) configures a provenance metadata policy (Operation 202). Configuring a provenance metadata policy determines, for a set of possible actions that a node may take with respect to payload data, which action(s) should trigger the generation of provenance metadata. A provenance metadata policy may be partly or wholly user-configurable. Configuring the provenance metadata policy may enable or disable provenance metadata generation for one or more of the following actions: receiving or "ingesting" payload data from a producer; disseminating payload data between nodes in the data provisioning layer; shaping or otherwise modifying payload data; transmitting payload data to a consumer; generating a trustworthiness metric; and/or another action or combination thereof. For example, in some cases, disabling provenance metadata for dissemination between nodes in the data provisioning layer may help avoid network congestion, particularly if network resources are scarce or timeliness is of the essence. On the other hand, less provenance metadata may limit a recipient's ability to assess the trustworthiness of the payload data. Therefore, the specific provenance metadata policy may reflect a subjective compromise between performance and security. In some cases, provenance metadata is always generated upon ingestion and shaping, while provenance metadata for intra-layer dissemination may be user-configurable.

In an embodiment, the system configures a trustworthiness computation rule (Operation 204). A trustworthiness computation rule supplies the logic for computing a trustworthiness metric. One or more elements of the trustworthiness computation rule may be user-configurable. For example, a trustworthiness metric may depend on how many hops the payload data took between the producer and the consumer, how many times the payload data was shaped or otherwise transformed in transit, whether the payload data passed through a cross-domain solution (CDS), and/or another factor or combination thereof. A trustworthiness metric may be a numerical value (e.g., a percentage or value on a predetermined scale). For example, the trustworthiness metric may be a scalar value in a range from 0 to 1, where 1 is highly trustworthy and 0 is not trustworthy. For a numerical value, the trustworthiness computation rule may assign weights W1 . . . WN (which may be user-configurable) to each factor f1 . . . fN (e.g., one or more factors in Table 1). The weights may be normalized to provide a trustworthiness metric in a consistent range (e.g., 0 to 1). The trustworthiness computation rule may use those weights to compute an aggregate function T(F) that represents the trustworthiness of the payload data:

$$T(F)=W1*f1+W2*f2+\ldots$$

Alternatively, a trustworthiness metric may be a categorical value that assigns payload data to a categorical "bucket." For example, the trustworthiness metric may have possible values of high, medium, or low. The trustworthiness computation rule may map combinations of factors (e.g., one or more factors in Table 1) to the different categories. Alternatively, the trustworthiness metric may be any other kind of value that provides a consistent, comparable metric for assessing the trustworthiness of payload data.

In an embodiment, a trustworthiness computation rule is based on one or more factors (some or all of which may a user may be able to enable, disable, or otherwise configure) that relate to the confidentiality, staleness, accuracy, integrity, and/or one or more other qualities of the payload data. Table 1 illustrates some examples of factors that may contribute to a trustworthiness computation rule:

TABLE 1

Trustworthiness Factors

| Factor | Measure | Type | Rationale |
| --- | --- | --- | --- |
| Payload data traversed a CDS? | Yes/No | Integrity | Operations taken by a CDS (e.g., sanitization) may represent a protocol break. |
| Number of hops | 0 . . . N | Integrity | The risk of corruption increases as data is sent over each node in an untrusted network. |
| Payload data is ABE- encrypted? | Yes/No | Confidentiality | If data is not ABE-encrypted, it may be read by adversaries and therefore may not be trustworthy for decision-making. |
| Payload data is signed? | Yes/No | Integrity | If data is not signed, it may be corrupted by an adversary. |
| Payload data is timestamped? | Yes/No | Staleness | Data that is not timestamped may be stale and therefore unreliable for decision-making. |
| Payload data has been shaped | Yes/No | Integrity and Accuracy | Shaping means the data can be corrupted (if the shaping node is compromised) or artifacts may be introduced by a benign shaping algorithm, which may trigger issues in applications (boundary cases) |
| Geocoordinates have been mapped from one format to another? | Yes/No | Accuracy | Mapping one format of geocoordinates to another format may introduce fidelity issues due to rounding, etc. |
| Authoritative data source? | Yes/No | Accuracy | Data from an unknown/untrusted data source may not be trustworthy. |

As mentioned above, different factors may be assigned different weights to compute a trustworthiness metric. Table 2 illustrates an example of weights assigned to the factors listed in Table 1:

TABLE 2

Example of Weighted Trustworthiness Factors

| Factor | Measure | Normalized Value | Weight |
| --- | --- | --- | --- |
| Payload data traversed a CDS? | Yes/No | 1 or 0 | 0.05 |
| Number of hops | 0 . . . N | N/X, where X is the maximum | 0.05 |

TABLE 2-continued

Example of Weighted Trustworthiness Factors

| Factor | Measure | Normalized Value | Weight |
| --- | --- | --- | --- |
| | | trusted number of hops | |
| Payload data is ABE- encrypted? | Yes/No | 1 or 0 | 0.1 |
| Payload data is signed? | Yes/No | 1 or 0 | 0.2 |
| Payload data is timestamped? | Yes/No | 1 or 0 | 0.1 |
| Payload data has been shaped | Yes/No | 1 or 0 | 0.2 |
| Geocoordinates have been mapped from one format to another? | Yes/No | 1 or 0 | 0.1 |
| Authoritative data source? | Yes/No | 1 or 0 | 0.2 |

In some cases, a trustworthiness computation rule may be conceptualized as a symmetrical decision tree, where each enabled factor is evaluated in the same order, regardless of what value (e.g., yes/no or I/O) was determined for the preceding factor. Alternatively, a trustworthiness computation rule may be an asymmetrical decision tree in which certain factors definitively indicate that payload data is trustworthy or untrustworthy, regardless of the other factors. For example, in some cases, payload data that does not come from an authoritative data source can never be considered trustworthy; accordingly, that factor may be placed at the "top" of the decision tree for computational efficiency.

Alternatively or additionally, the system may use machine learning to train a machine learning model based on a labeled set of training data. For example, the training data may include multiple sets of payload data and associated provenance metadata. Each set may labeled with a supervisory signal indicating a trustworthiness metric associated with the payload data. The system may use the machine learning model to assess the trustworthiness of new payload data, based on provenance metadata generated by the system. In practice, some applications will not have enough training data available to rely on machine learning.

In an embodiment, a node in a data provisioning layer receives encrypted payload data (Operation 206). The node may receive the encrypted payload data from a producer, another node in the data provisioning layer, a cross-domain solution (CDS), or another source. If the node is receiving the payload data from a source outside the data provisioning layer (i.e., ingesting the payload data into the data provisioning layer), the payload data may be unencrypted as received, and the node may encrypt the payload data before disseminating the encrypted payload data. The node may also obtain and store metadata that describes the source of the payload data.

In an embodiment, the node determines whether data shaping is enabled (Operation 208). Data shaping may be enabled on an "always on" basis, i.e., to be performed for all data flowing through the node. Alternatively, data shaping may be enabled on an "as-needed" basis, depending on one or more factors such as network congestion, message priority, quality of service (QoS) agreements, etc. If data shaping is enabled, the node may determine whether it is authorized to decrypt the payload data (Operation 210). If the node is not authorized to decrypt the payload data, then the node may be unable to shape the payload data. Alternatively, one or more shaping operations, such as segmenting the payload data into multiple messages, may still be possible. If the node is authorized to decrypt the payload data, or if decryption is not required to shape the payload data, then the shapes the payload data (Operation 212). For example, the node may compress, segment, or otherwise modify the payload data.

In an embodiment, the node determines whether provenance metadata is enabled (Operation 214). To determine whether provenance metadata is enabled, the node may reference a provenance metadata policy. If the provenance metadata policy indicates that provenance metadata is enabled for an action to be taken by the node with respect to the payload data, then the node generates provenance metadata (Operation 216). The provenance metadata describes the action(s) that were taken by the node with respect to the payload data and for which provenance metadata is enabled.

In an embodiment, the provenance metadata includes information that uniquely associates it with the encrypted payload data. For example, a node that ingests the payload data into the data provisioning layer may generate a global unique identifier (GUID) for the payload data. To allow for associating provenance metadata with encrypted payload data without needing to decrypt the encrypted payload data, the GUID may be stored in either an unencrypted format or an encrypted format that is accessible to other nodes in the data provisioning layer. The GUID may be disseminated along with the encrypted payload data. When a node generates provenance metadata associated with the encrypted payload data, the node may store the GUID in the provenance metadata, to logically associate the provenance metadata with the encrypted payload data.

In an embodiment, the node encrypts the provenance metadata (Operation 218). The node may encrypt the provenance metadata using the same security policy (e.g., the same attribute-based encryption (ABE) policy or other kind of security policy) that was used to encrypt the payload data. Alternatively, the node may use a different security policy to encrypt the provenance metadata.

In an embodiment, the node determines whether it is the final node before the payload data reaches the consumer (Operation 220). If the node is the final node, then the node may compute a trustworthiness metric (Operation 222) based on the provenance metadata associated with the payload data. The node delivers the encrypted payload data and the trustworthiness metric to the consumer (Operation 224). In this manner, the data provisioning layer may provide the trustworthiness computation as a service to the consumer. Alternatively or additionally, the node may act as a filter for trustworthy payload data. Specifically, the node may evaluate the trustworthiness metric (e.g., by comparing it with a threshold metric that indicates a minimum acceptable level of trustworthiness) and only transmit the payload data to the consumer if the threshold is satisfied. Alternatively or additionally, the node may deliver the encrypted payload data along with the provenance metadata associated with the payload data. The consumer may itself compute a trustworthiness metric based on the provenance metadata.

In some cases, the node may compute updated trustworthiness metrics as additional provenance metadata becomes available (for example, if the data provisioning layer disseminates provenance metadata and payload data in separate messages, which may not arrive at the node simultaneously). The node may compute and provide a trustworthiness metric to the consumer even after the payload data has already been provided to the consumer. The node may release payload data to the consumer even if insufficient provenance metadata is available to compute an initial trustworthiness metric. Alternatively or additionally, in response to receiving additional provenance metadata, the node may compute and provide an updated version of a previously computed and provided trustworthiness metric. When the node provides a trustworthiness metric to the consumer, the node may include a confidence metric that indicates a level of confidence (e.g., high/medium/low, or a value on a numerical scale such as 0 to 1) in the trustworthiness metric. For example, confidence in the trustworthiness metric may be relatively low if the trustworthiness metric is based on a small or incomplete set of provenance metadata, and higher if the trustworthiness metric is based on a large or complete set of provenance metadata.

In an embodiment, if the node is not the final node (i.e., as determined in Operation 220), then the node forwards the encrypted payload data and any provenance metadata associated with the payload data (i.e., provenance metadata generated by the node and/or one or more previous nodes that handled the payload data) via the data provisioning layer (Operation 226). Another node in the data provisioning layer may receive encrypted payload data and provenance metadata and perform one or more operations described above to continue advancing the message(s) across the network toward the consumer.

In an embodiment, the system aggregates provenance metadata and/or trustworthiness metrics (Operation 228) generated over multiple payload data transmissions. For example, the system may store provenance metadata and/or trustworthiness metrics in a database that supports querying across multiple metadata records. Aggregated provenance metadata and/or trustworthiness metrics may be used to generate additional metrics, analyze and/or visualize provenance flows, and/or generate other kinds of insights regarding data dissemination through the data provisioning layer. For example, trustworthiness metrics over time may indicate a trend. New payload data not conforming to the trend may be considered an outlier, and may thus be considered less trustworthy. Such determinations may use statistical analysis (e.g., establishing a trend line and determining whether a new metric falls excessively far from the trend line) or model-based analysis (e.g., modeling data transmission speeds between nodes and determining whether the reported speed of transmission of a particular payload data conforms to the model). In an embodiment, linear regression is used to identify outliers. For each data point in the aggregated data, the system calculates the distance from a fitted line. The system may store information in a stack data structure, remove the top value from the stack, and calculate outlier influence with Cooke's formula:

$$D_i = \frac{\sum_{j=1}^{n} (\hat{Y}_j - \hat{Y}_{j(i)})^2}{(p+1)\hat{\sigma}^2}$$

Alternatively, another technique may be used to identify outliers.

Detailed examples are described below for purposes of clarity. Components and/or operations described below should be understood as examples that may not be applicable to one or more embodiments. Accordingly, components and/or operations described below should not be construed as limiting the scope of one or more embodiments.

Figure 3A:
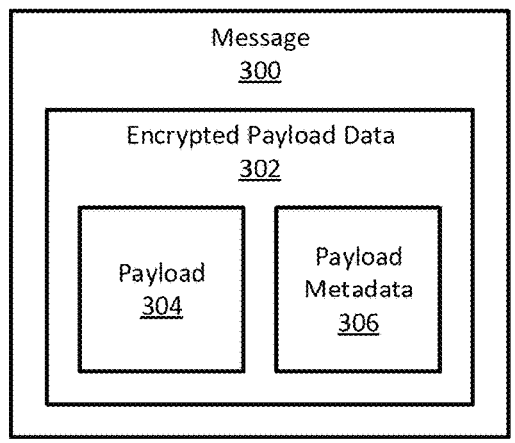
FIGS. 3A-3C are block diagrams of examples of messages according to an embodiment.
Figure 3B:
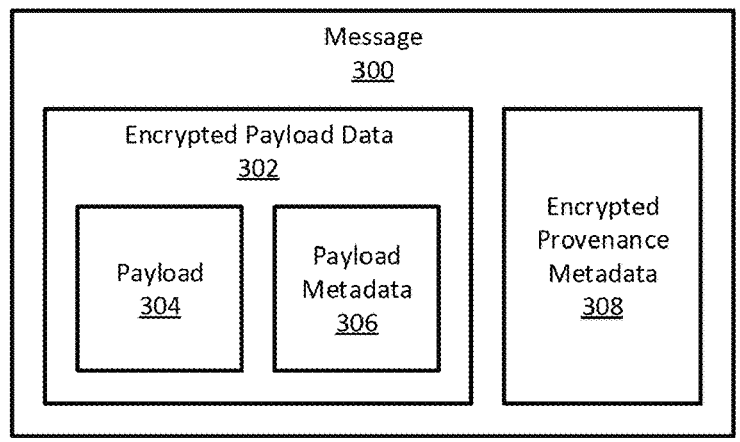
Figure 3C:
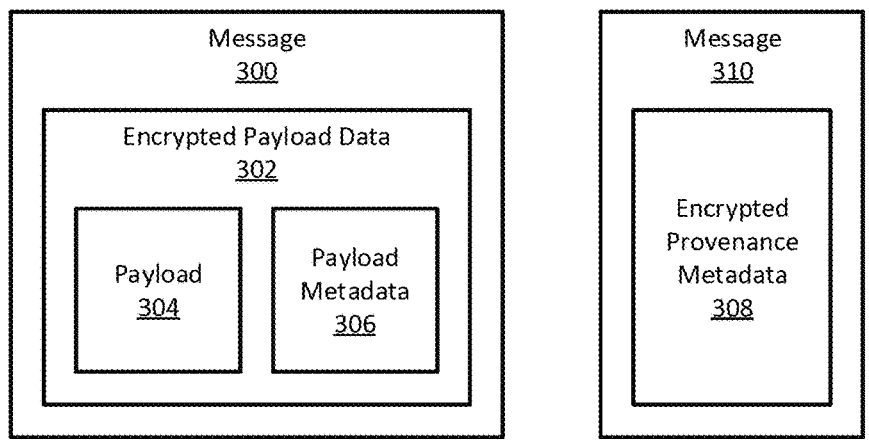

FIGS. 3A-3C are block diagrams of examples of messages according to an embodiment. FIG. 3A illustrates a message 300 that includes encrypted payload data 302, without any provenance metadata. The encrypted payload data 302 includes the payload 304 itself, and may also include payload metadata 306. Payload metadata 306 is metadata that describes the payload 304. For example, the payload metadata 306 may include information such as a timestamp indicating when the payload 304 was created, a timestamp indicating when the payload 304 was last modified, an author of the payload 304, a data size of the payload 304, and/or another type of metadata or combination thereof.

When a node generates provenance metadata, the provenance metadata may be included as part of the same message as the payload data, or may be part of a separate message. In FIG. 3B, encrypted provenance data 308 is bundled into the same message 300 as the encrypted payload data 302. In this example, the encrypted payload data 302 and encrypted provenance metadata 308 are disseminated simultaneously, as part of the same message 300. In FIG. 3C, the encrypted provenance metadata 308 is bundled in a separate message 310 from the encrypted payload data 302. In this example, the two messages 300, 310 may be disseminated at the same time or asynchronously. Thus, a node or consumer receiving the message 300 with the encrypted payload data 302 may have the option of processing (e.g., decrypting, disseminating, and/or otherwise processing) the encrypted payload data 302 even if the message 310 with the encrypted provenance metadata 308 has not been received. This approach may be useful, for example, if the encrypted payload data 302 is urgent or otherwise time-sensitive, and where bundling the encrypted provenance metadata 308 in the message 300 may compromise the timeliness of the message 300 (for example, in conditions where network congestion makes it easier to transmit smaller messages). Separating the messages 300, 310 may also be useful in situations where nodes and/or consumers do not make trustworthiness determinations based on provenance metadata, but use provenance metadata to asynchronously analyze provenance flows and/or other network properties.

Figure 4:
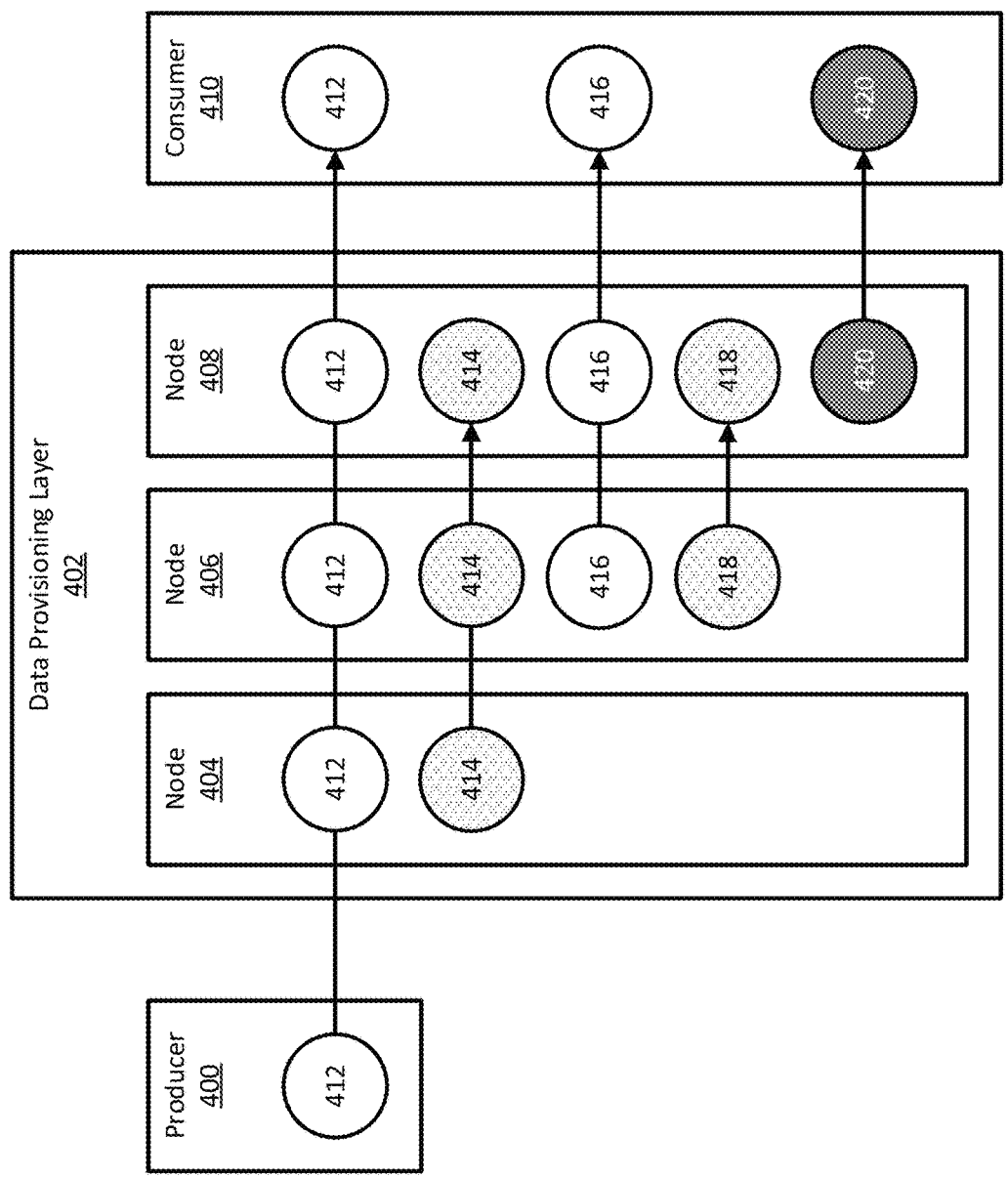
FIG. 4 illustrates an example of metadata-based information provenance according to an embodiment.

FIG. 4 illustrates an example of metadata-based information provenance according to an embodiment. In this example, a producer 400 publishes payload data 412 to a data provisioning layer 402. A node 404 receives the payload data (i.e., ingests the payload data 412 into the data provisioning layer 402) and generates provenance metadata 414 indicating that the node 404 received the payload data 412. The provenance metadata 414 may include metadata that identifies the node 404, a timestamp when the payload data 412 was ingested, and/or another kind of metadata.

Node 406 in the data provisioning layer 402 receives the payload data 412 and the provenance metadata 414 from node 404 (either in a single message or separate messages, as described above). In this example, node 406 shapes the payload data 412 by generating a compressed version 416 of the payload data. Node 406 generates provenance metadata 418 that describes the shaping action. In this example, provenance metadata for dissemination between nodes of the data provisioning layer 402 is disabled, so the node 406 does not generate any provenance metadata to indicate receipt of the payload data 412.

Node 408 in the data provisioning layer 402 receives the original payload data 412, the provenance metadata 414 generated by node 404, the compressed payload data 416, and the provenance metadata 418 generated by node 406. As described above, node 408 may receive some or all of these items asynchronously. Because metadata for dissemination between nodes of the data provisioning layer 402 is disabled, node 408 does not generate any provenance metadata to indicate receipt of the payload data 412 or the compressed payload data 416.

In this example, node 408 is the final node in the data provisioning layer 402 before the payload data 412 reaches a consumer 410. Based on the provenance metadata 414 generated by node 404 and the provenance metadata generated by node 406, node 408 computes a trustworthiness metric 420. The consumer 410 receives the payload data 412, the compressed payload data 416, and the trustworthiness metric 420 from node 408. Alternatively, the consumer 410 may receive the provenance metadata 414, 418 and compute a trustworthiness metric based on the provenance metadata 414, 418. As described above, the consumer 410 may receive some or all of these items asynchronously.

Figure 5:
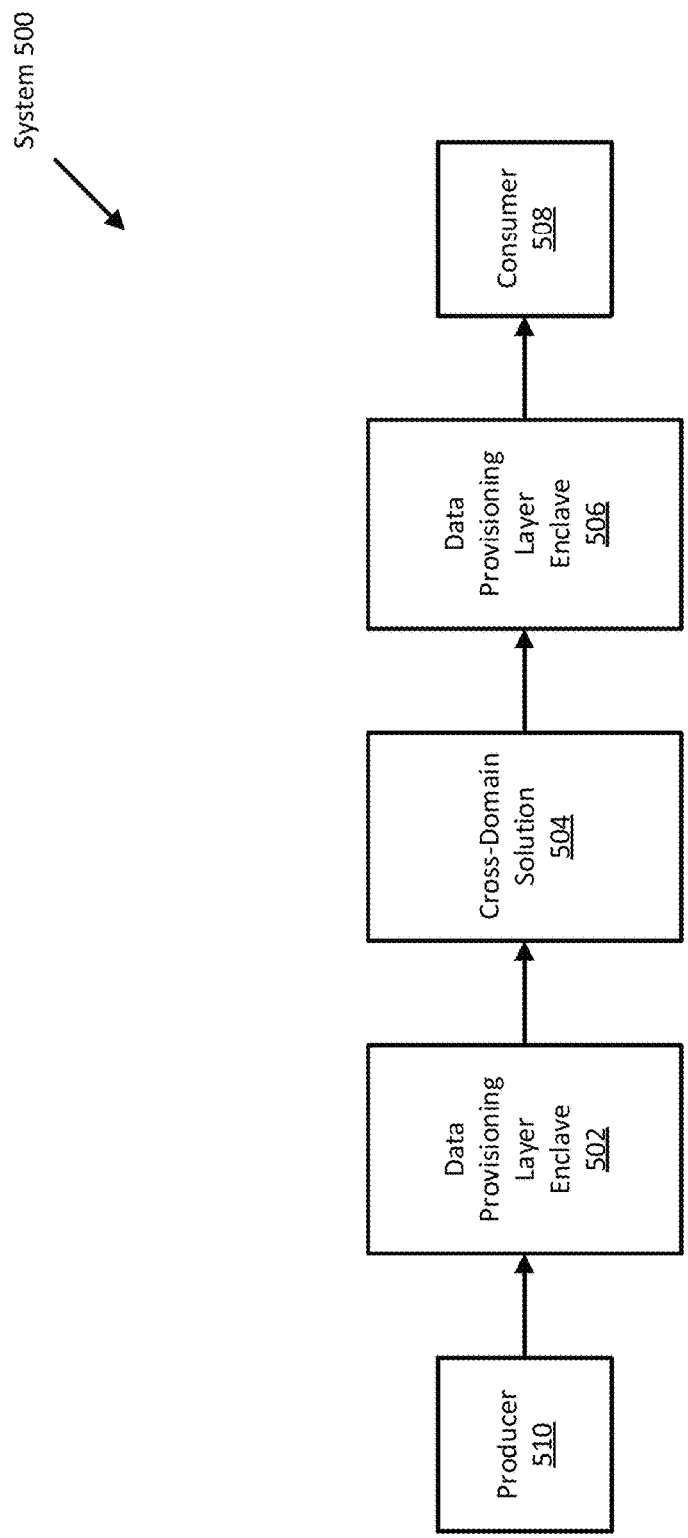
FIG. 5 is a block diagram of an example of a system according to an embodiment.

FIG. 5 is a block diagram of an example of a system according to an embodiment. Specifically, FIG. 5 illustrates an example of a system 100 in which a producer 510 and a consumer 508 are separated by a cross-domain solution 504. To disseminate payload data from the producer 510 to the consumer 508, a data provisioning layer may be logically separated into two or more "enclaves" of nodes: data provisioning layer enclave 502 and data provisioning layer enclave 506. Each of the enclaves 502, 506 may include one or more nodes configured to operate as described above. The enclaves 502, 506 may be part of a single data provisioning layer operated by the same entity (e.g., a company, military organization, or other entity), or may be operated by separate entities. When a node in data provisioning layer enclave 506 receives payload data from the cross-domain solution 504, the node may be configured to generate different kinds of provenance metadata, depending on how much information the cross-domain solution 504 reports. For example, if the cross-domain solution 504 reports that it shaped or otherwise transformed the payload data in some way, the node may generate provenance metadata that describes the action(s) taken by the cross-domain solution 504. Alternatively, if the cross-domain solution 504 operates as a "black box" and does not report its actions, the node may generate provenance metadata that indicates ingestion of the payload data into the data provisioning layer enclave 506. As noted above, the provenance metadata generated may depend on a provenance metadata policy.

Figure 6:
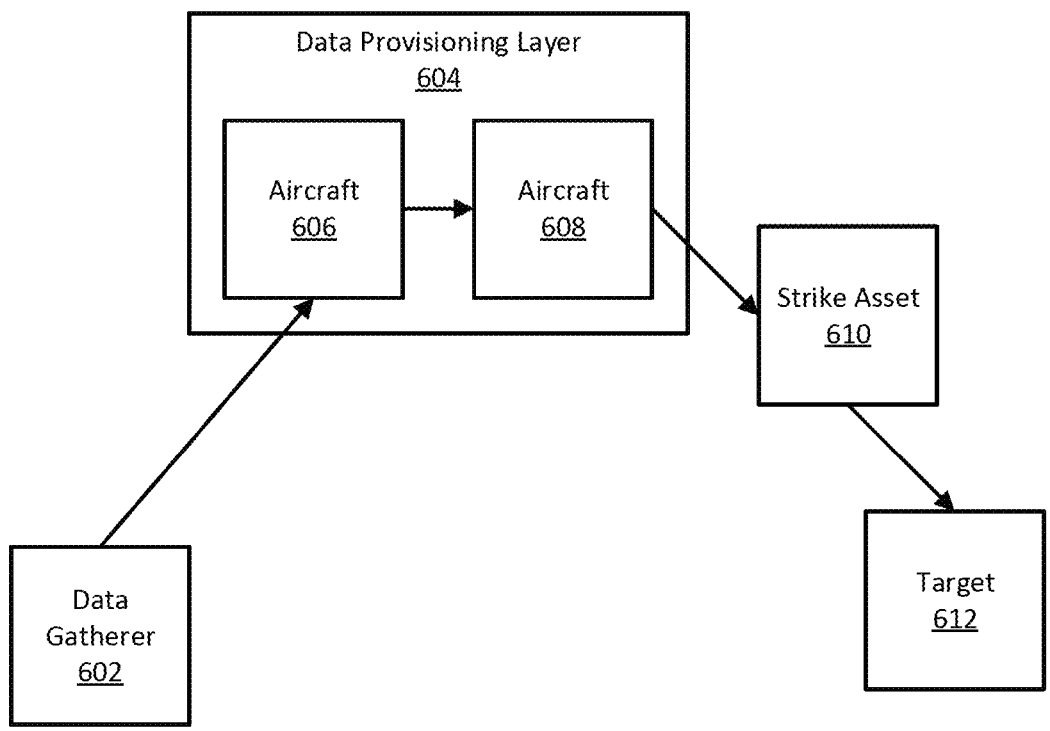
FIG. 6 illustrates an example of metadata-based information provenance at the tactical edge according to an embodiment.

FIG. 6 illustrates an example of metadata-based information provenance at the tactical edge according to an embodiment. A data gatherer 602 is configured to gather mission-critical data. In this example, the data gatherer is an imaging device configured to gather payload data that includes target imagery with geo-locating metadata. The data gatherer 602 publishes the payload data to a data provisioning layer 604. In this example, the data provisioning layer 604 is implemented across aircraft 606, 608 that are configured to communicate with each other (e.g., via line-of-site and/or beyond-line-of-sight waveforms). Aircraft 606 ingests the payload and generates provenance metadata describing the ingestion. Because the payload data is mission-critical, aircraft 606 prioritizes dissemination of the imagery and provenance metadata to aircraft 608 within the data provisioning layer 604. Aircraft 608 computes a trustworthiness metric based on the provenance metadata. Aircraft 608 supplies the imagery and the trustworthiness metric to a strike asset 610 (e.g., an airborne or ground asset, which may be manned or unmanned) at the tactical edge. The payload data may also be used to securely task a strike asset 610 with the capacity (e.g., line of sight, appropriate ordnance, etc.) to strike the target 612. The strike asset 610 compares the trustworthiness metric with a threshold trustworthiness criterion, to determine whether the imagery can be trusted. Alternatively, aircraft 608 may compare the trustworthiness metric with a threshold trustworthiness criterion; and if the trustworthiness metric indicates that the imagery cannot be trusted, aircraft 608 may refrain from delivering the imagery to the strike asset 610. If the imagery can be trusted, then the strike asset 610 uses the imagery to locate and strike the target 612.

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 7:
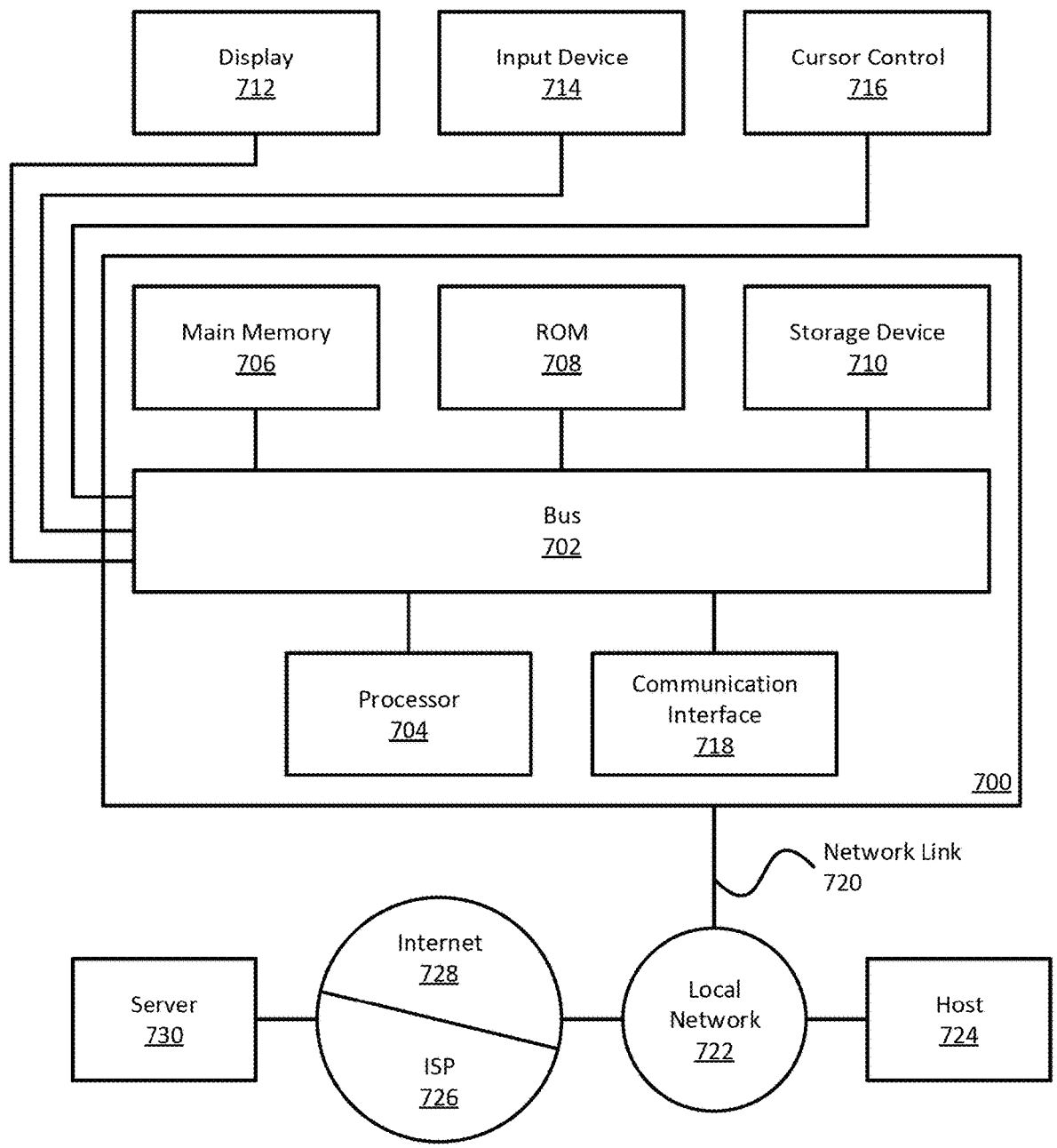
FIG. 7 is a block diagram of an example of a computer system according to an embodiment.

For example, FIG. 7 is a block diagram of an example of a computer system 700 according to an embodiment. Computer system 700 includes a bus 702 or other communication mechanism for communicating information, and a hardware processor 704 coupled with the bus 702 for processing information. Hardware processor 704 may be a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in one or more non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or additionally, computer system 700 may receive user input via a cursor control 716, such as a mouse, a trackball, a trackpad, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Alternatively or additionally, computer system 7 may include a touchscreen. Display 712 may be configured to receive user input via one or more pressure-sensitive sensors, multi-touch sensors, and/or gesture sensors. Alternatively or additionally, computer system 700 may receive user input via a microphone, video camera, and/or some other kind of user input device (not shown).

Computer system 700 may implement the techniques described herein using customized hard-wired logic, one or more ASICs or FPGAs, firmware, and/or program logic which in combination with other components of computer system 700 causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 702. Transmission media may also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 700 may receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718.

The received code may be executed by processor 704 as it is received, and/or stored in storage device 710, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:
1. One or more non-transitory machine-readable media storing instructions that, when executed by one or more processors, cause:
    a first node in a data provisioning layer receiving encrypted payload data to be delivered to a recipient;

the first node generating first provenance metadata that describes at least one action taken by the first node with respect to the encrypted payload data; and the first node transmitting the encrypted payload data and the first provenance metadata via the data provisioning layer toward the recipient.

2. The one or more non-transitory machine-readable media of claim 1, wherein the at least one action taken by the first node with respect to the encrypted payload data comprises one or more of (a) transforming decrypted contents of the encrypted payload data and/or (b) receiving the encrypted payload data.

3. The one or more non-transitory machine-readable media of claim 1, further storing instructions that, when executed by one or more processors, cause:

a second node in the data provisioning layer receiving the encrypted payload data and the first provenance metadata; and based at least on the first provenance metadata, the second node computing a trustworthiness metric associated with the encrypted payload data.

4. The one or more media of claim 3, wherein computing the trustworthiness metric comprises applying at least one user-configurable trustworthiness rule to the first provenance metadata.

5. The one or more non-transitory machine-readable media of claim 1, further storing instructions that, when executed by one or more processors, cause:

the first node encrypting the first provenance metadata, using a first encryption policy that is different from a second encryption policy used to encrypt the encrypted payload data.

6. The one or more non-transitory machine-readable media of claim 1, wherein the first node is not authorized to decrypt the encrypted payload data, and generating the first provenance metadata is performed without decrypting the encrypted payload data.

7. The one or more non-transitory machine-readable media of claim 1, the recipient being physically located at a tactical edge of a military mission.

8. The one or more non-transitory machine-readable media of claim 1, further storing instructions that, when executed by one or more processors, cause:

receiving user input that defines at least part of a provenance metadata policy; and responsive to receiving the user input, configuring the first node to generate the first provenance metadata according to the provenance metadata policy.

9. The one or more non-transitory machine-readable media of claim 1, further storing instructions that, when executed by one or more processors, cause:

aggregating the first provenance data with a set of provenance metadata associated with a plurality of payload transmissions; and based at least on the set of provenance metadata, generating a visual representation of one or more provenance paths through the data provisioning layer.

10. A system comprising:

a data provisioning layer; and a first node in the data provisioning layer, configured to perform operations comprising:

receiving encrypted payload data to be delivered to a recipient, generating first provenance metadata that describes at least one action taken by the first node with respect to the encrypted payload data, and transmitting the encrypted payload data and the first provenance metadata via the data provisioning layer toward the recipient.

11. The system of claim 10, further comprising:

a second node in the data provisioning layer, configured to perform further operations comprising:

receiving the encrypted payload data and the first provenance metadata, and based at least on the first provenance metadata, computing a trustworthiness metric associated with the encrypted payload data.

12. A method comprising:

receiving, by a first node in a data provisioning layer, encrypted payload data to be delivered to a recipient;

generating, by the first node, first provenance metadata that describes at least one action taken by the first node with respect to the encrypted payload data; and transmitting, by the first node, the encrypted payload data and the first provenance metadata via the data provisioning layer toward the recipient.

13. The method of claim 12, wherein the at least one action taken by the first node with respect to the encrypted payload data comprises one or more of (a) transforming decrypted contents of the encrypted payload data and/or (b) receiving the encrypted payload data.

14. The method of claim 12, further comprising:

receiving, by a second node in the data provisioning layer, the encrypted payload data and the first provenance metadata; and based at least on the first provenance metadata, computing, by the second node, a trustworthiness metric associated with the encrypted payload data.

15. The method of claim 14, wherein computing the trustworthiness metric comprises applying at least one user-configurable trustworthiness rule to the first provenance metadata.

16. The method of claim 12, further comprising:

encrypting, by the first node, the first provenance metadata, using a first encryption policy that is different from a second encryption policy used to encrypt the encrypted payload data.

17. The method of claim 12, wherein the first node is not authorized to decrypt the encrypted payload data, and generating the first provenance metadata is performed without decrypting the encrypted payload data.

18. The method of claim 12, transmitting the encrypted payload data and the first provenance data via the provisioning layer toward the recipient being performed toward a tactical edge of a military mission.

19. The method of claim 12, further comprising:

receiving user input that defines at least part of a provenance metadata policy; and responsive to receiving the user input, configuring the first node to generate the first provenance metadata according to the provenance metadata policy.

20. The method of claim 12, further comprising:

aggregating the first provenance data with a set of provenance metadata associated with a plurality of payload transmissions; and based at least on the set of provenance metadata, generating a visual representation of one or more provenance paths through the data provisioning layer.

* * * * *